United States Patent
DiGiovanni et al.

(10) Patent No.: US 10,350,563 B2
(45) Date of Patent: Jul. 16, 2019

(54) METHODS OF FORMING POLYCRYSTALLINE DIAMOND COMPACTS

(71) Applicant: Baker Hughes Incorporated, Houston, TX (US)

(72) Inventors: Anthony A. DiGiovanni, Houston, TX (US); Danny E. Scott, Montgomery, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 528 days.

(21) Appl. No.: 15/068,140

(22) Filed: Mar. 11, 2016

(65) Prior Publication Data

US 2016/0193718 A1  Jul. 7, 2016

Related U.S. Application Data

(63) Continuation of application No. 13/622,530, filed on Sep. 19, 2012, now Pat. No. 9,302,236.

(Continued)

(51) Int. Cl.
*B01J 3/06* (2006.01)
*C21D 1/26* (2006.01)
(Continued)

(52) U.S. Cl.
CPC ............... *B01J 3/062* (2013.01); *B01J 3/067* (2013.01); *B24D 3/14* (2013.01); *B24D 18/0009* (2013.01);
(Continued)

(58) Field of Classification Search
CPC ...... B24D 3/00; B24D 18/00; B24D 18/0009; B24D 3/06; B24D 3/10; B24D 3/14;
(Continued)

(56) References Cited

U.S. PATENT DOCUMENTS 4,224,380 A  9/1980 Bovenkerk et al.
5,127,923 A  7/1992 Bunting et al.
(Continued)

FOREIGN PATENT DOCUMENTS

GB  2345710 A  7/2000
GB  2493451 A  2/2013
WO  2007083248 A1  7/2007

OTHER PUBLICATIONS

European Search Report from European International Application No. 16200726.4, dated Apr. 21, 2017, 5 pages.
(Continued)

*Primary Examiner* — Alexandra M Moore
(74) *Attorney, Agent, or Firm* — TraskBritt (57) ABSTRACT

Methods for forming cutting elements comprising polycrystalline materials, methods for forming polycrystalline compacts for cutting elements of a drilling tool, methods for forming polycrystalline diamond compacts, and resulting polycrystalline compacts and cutting elements are disclosed. Grains of a hard material are introduced to a press and subjected to a high-pressure, high-temperature (HPHT) process to sinter the grains. The system conditions (i.e., temperature and pressure) are then adjusted past a phase or state change point, after which, at least one of the system conditions is held during an anneal stage before the system conditions are adjusted to final levels. The resulting compacts and cutting elements may therefore include intergranularly bonded hard material grains with a more stable microstructure (e.g., less stressed microstructure) than a polycrystalline compact and cutting element formed without an anneal stage during the HPHT process.

20 Claims, 8 Drawing Sheets

Related U.S. Application Data (60) Provisional application No. 61/536,262, filed on Sep. 19, 2011.

(51) Int. Cl.
| | | |
|---|---|---|
| *C22F 1/18* | (2006.01) | |
| *B24D 3/14* | (2006.01) | |
| *B24D 18/00* | (2006.01) | |
| *B24D 99/00* | (2010.01) | |
| *E21B 10/567* | (2006.01) | |
| *E21B 10/55* | (2006.01) | |

(52) U.S. Cl.
CPC ............. *B24D 99/005* (2013.01); *C21D 1/26* (2013.01); *C22F 1/18* (2013.01); *E21B 10/55* (2013.01); *E21B 10/567* (2013.01); *B01J 2203/062* (2013.01); *B01J 2203/0655* (2013.01); *B01J 2203/0685* (2013.01)

(58) Field of Classification Search
CPC ....... B24D 99/00; B24D 99/005; E21B 10/00; E21B 10/46; E21B 10/54; E21B 10/55; E21B 10/56; E21B 10/567; E21B 10/42; E21B 10/44; B23B 27/20; B23B 27/00; B01J 3/06; B01J 3/062; B01J 3/067; B01J 2203/062; B01J 2203/0655; B01J 2203/0685; C22F 1/18; C04B 35/00; C04B 35/022; C04B 2235/00; C04B 2235/32; C04B 2235/3201; C04B 2235/3205; C04B 2235/3817; C04B 2235/3826; C04B 2235/3839; C04B 2235/3847; C04B 2235/3856; C04B 2235/427; C04B 2235/5463; C04B 2235/5472; C04B 2235/661; C04B 2235/662; C04B 2235/78; C04B 2235/782; C04B 2235/783; C01B 32/25; C21D 1/26

See application file for complete search history.

(56) References Cited

U.S. PATENT DOCUMENTS

| | | | |
|---|---|---|---|
| 5,890,552 A | 4/1999 | Scott et al. | |
| 5,989,489 A | 11/1999 | Stuivinga et al. | |
| 6,220,375 B1 | 4/2001 | Butcher et al. | |
| 6,342,301 B1 | 1/2002 | Yoshida et al. | |
| 6,521,174 B1 | 2/2003 | Butcher et al. | |
| 6,531,423 B1* | 3/2003 | Schwetz | ............... C04B 35/575 501/89 |
| 6,872,356 B2 | 3/2005 | Butcher et al. | |
| 7,575,805 B2 | 8/2009 | Achilles et al. | |
| 7,658,781 B1* | 2/2010 | Waggoner | ............. C04B 35/565 428/539.5 |
| 7,754,333 B2 | 7/2010 | Eyre et al. | |
| 8,080,071 B1 | 12/2011 | Vail | |
| 8,192,658 B2 | 6/2012 | Bezubic, Jr. | |
| 9,039,798 B2 | 5/2015 | Lai Sang et al. | |
| 2009/0173015 A1 | 7/2009 | Keshavan et al. | |
| 2010/0243337 A1 | 9/2010 | Scott | |
| 2010/0326740 A1* | 12/2010 | Hall | ..................... B23K 20/023 175/428 |
| 2011/0030283 A1 | 2/2011 | Cariveau et al. | |
| 2011/0031034 A1 | 2/2011 | DiGiovanni et al. | |
| 2011/0061942 A1 | 3/2011 | DiGiovanni | |
| 2011/0073379 A1 | 3/2011 | DiGiovanni et al. | |
| 2011/0088954 A1 | 4/2011 | DiGiovanni et al. | |
| 2012/0261197 A1 | 10/2012 | Miess et al. | |
| 2013/0068536 A1 | 3/2013 | DiGiovanni et al. | |

OTHER PUBLICATIONS

European Search Report from European International Application No. 12832997.6, dated Nov. 27, 2015, 7 pages.

Kriven, Waltraud M. Transformation Toughening of Composite Ceramics, Interim Report for the Period Mar. 1, 1989 to Sep. 30, 1990, prepared for Air Force Office of Scientific Research, Oct. 30, 1990, Dept. of Materials Science and Engineering, Univ. of Illinois at Urbana-Champaign, Urbana, IL, pp. 1-129.

PCT International Preliminary Report on Patentability of the International Searching Authority for PCT/US2012/055842 dated Mar. 25, 2014, 6 pages.

PCT International Search Report of the International Searching Authority for PCT/US2012/055842, dated Feb. 27, 2013 3 pages.

PCT Written Opinion of the International Searching Authority for PCT/US2012/055842, dated Feb. 27, 2013, 5 pages.

Rice, Roy W., Ceramic Fabrication Technology, © 2003, Marcel Dekker AG, New York, NY, pp. 206-207.

Richerson, David W., Modern Ceramic Engineering: Properties, Processing, and Use in Design, © 1992, Marcel Dekker, Inc., New York, NY, pp. 613-614.

Wikipedia, Hot pressing, page last modified on Jan. 3, 2013 at 8:53 am.

* cited by examiner

METHODS OF FORMING POLYCRYSTALLINE DIAMOND COMPACTS

CROSS-REFERENCE TO RELATED APPLICATIONS

This application is a continuation of U.S. patent application Ser. No. 13/622,530, filed Sep. 19, 2012, now U.S. Pat. No. 9,302,236, issued Apr. 5, 2016, which application claims the benefit of U.S. Provisional Patent Application Ser. No. 61/536,262, filed Sep. 19, 2011, the disclosure of each of which is hereby incorporated herein in its entirety by this reference.

TECHNICAL FIELD

Embodiments of the present disclosure relate to polycrystalline compacts, to tools including such compacts, and to methods of forming such polycrystalline compacts and tools.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements fixedly attached to a bit body of the fixed-cutter drill bit. Similarly, roller cone earth-boring rotary drill bits include cones that are mounted on bearing pins extending from legs of a bit body such that each cone is capable of rotating about the bearing pin on which it is mounted. A plurality of cutting elements may be mounted to each cone of such roller cone drill bit.

The cutting elements used in fixed-cutter, roller cone, and other earth-boring tools often include polycrystalline compact cutting elements, e.g., polycrystalline diamond compact ("PDC") cutting elements. The polycrystalline compact cutting elements include cutting faces of a polycrystalline compact of diamond or another hard material (collectively referred to herein as "hard material"). Grains or crystals of the hard material are inter-bonded within the polycrystalline compact. (The terms "grain" and "crystal" are used synonymously and interchangeably herein.) Thus, the polycrystalline compacts include direct, inter-granular bonds between the grains or crystals of hard material.

Polycrystalline compact cutting elements may be formed by sintering and bonding together relatively small grains of the hard material in the presence of a metal solvent catalyst under high temperature and high pressure conditions (referred to herein as "high-pressure, high-temperature processes" ("HPHT processes") or "high-temperature, high-pressure processes" ("HTHP processes")). The HPHT process forms a layer or "table" of polycrystalline diamond material (or alternative hard material), which may be formed on or later joined with a cutting element substrate. The cutting element substrate may comprise a cermet material (i.e., a ceramic-metal composite material) such as, for example, cobalt-cemented tungsten carbide.

The metal solvent catalyst may include, for example, cobalt, iron, nickel, or alloys and mixtures thereof. The catalyst, which may initially be in a powdered form, may be mixed with the grains of hard material prior to sintering the grains together in the HPHT process. Alternatively or additionally, when a polycrystalline compact is formed on a cutting element substrate that includes a material such as cobalt, the cobalt, or other such material, from the substrate may be swept into the grains of hard material during the sintering process and may serve as the catalyst material for forming the inter-granular bonds between the grains of hard material. For example, cobalt from a substrate may be swept into overlying diamond grains of a diamond table to be formed and may catalyze the formation of diamond-to-diamond bonds.

Upon formation of a polycrystalline table using an HPHT process, catalyst material may remain in interstitial spaces between the grains of hard material in the resulting polycrystalline table. The presence of the catalyst material in the polycrystalline table may contribute to thermal damage in the polycrystalline table when the cutting element is heated, during use, due to friction at the contact point between the cutting element and the earth formation. To reduce the amount of catalyst material remaining in the polycrystalline table after formation, and, therefore, to reduce the likelihood of subsequent thermal damage during drilling, smaller grains of hard material may be included in the interstitial spaces between grains of hard material. Where the hard material is diamond, the smaller, fine grains may also be diamond. These interstitial fine grains of hard material increase the amount of hard material included in the polycrystalline table formed, lower the amount of catalyst needed to fill remaining interstitial space, and contribute to the hardness and strength of the cutting element while lessening the risk of thermal damage.

The HPHT process may be carried out by introducing the grains of hard material and, optionally, the catalyst material intermixed with the grains to a press (e.g., a diamond press, a cubic press, or other such press) either with or without a substrate. The press is configured to subject the materials therein to extreme pressures and temperatures. The pressure and power input can be adjusted, with adjustments to the power input yielding a change in the temperature within the press. Due to the extreme temperatures involved, the temperature within the HPHT system may not be directly monitored, but may be a factor of the power input.

A conventional HPHT process for forming a diamond table of a PDC may generally include a raise in pressure until the diamond material is near a sintering range. Power may then be steadily applied to provide essentially a steady temperature. The steady application of power at steady application of pressure provides for a relatively flat interval, or "plateau," which may be held for several minutes or longer at a relatively steady pressure and temperature. Thereafter, the temperature and pressure of the system are dropped to well below the diamond stable region before the formed parts are removed from the HPHT system. This HPHT process may be represented by temperature versus time and pressure versus time profiles such as those illustrated in FIGS. 7 and 8.

In a conventional HPHT process, the materials subjected to the temperature and pressure changes pass change points at which the materials tend to undergo changes in phase. Phase or state changes at or past such change points result in adjustments to the atomic microstructure of the materials. Such HPHT processing may lead to a build-up of extensive residual stresses in the atomic microstructure due to frictional constraints within a fine-grained or nano-enhanced PDC microstructure. These residual stresses can lead to cracking or delamination between the components of a cutting element. That is, differences in properties of the various materials within the polycrystalline table of the cutting element may react differently to changes (e.g., decreases or increases) in temperature and pressure. For example, materials may expand or contract at different rates and contribute to thermal damage in the diamond table when the cutting element is heated during use or thereafter cooled. Thus, when the cutting element is used to cut at rock, friction between the cutting element and the bore-wall surface heats the cutting element, and carbides within the substrate may expand twice as fast as the hard material (e.g., diamond) within the polycrystalline table. The expansion can lead to structural failure in the atomic microstructure of the materials within the diamond table.

BRIEF SUMMARY

Embodiments of the present methods may accommodate formation of a polycrystalline compact structure having an improved microstructure with high hard material density and improved thermal stability.

Disclosed is a method for forming a cutting element comprising a polycrystalline material supported by a substrate. The method comprises introducing grains of a hard material to a press. A system temperature is elevated to a sintering temperature. A system pressure is elevated to a sintering pressure. The system temperature is lowered to a hold temperature past a change point at a change point temperature. The hold temperature is lower than the change point temperature. The system temperature is held at the hold temperature. The system temperature is lowered to a final temperature.

Also disclosed is a method for forming a polycrystalline compact for a cutting element of a drilling tool. The method comprises subjecting grains of a hard material to a press. System conditions, comprising a system temperature and a system pressure, are adjusted to a plateau condition. Adjusting the system conditions to a plateau condition comprises adjusting the system temperature to a plateau temperature and adjusting the system pressure to a plateau pressure. The grains of the hard material are sintered at the plateau condition. At least one of the system conditions is adjusted from the plateau condition past a change point to an anneal condition. The at least one of the system conditions adjusted to the anneal condition is held at the anneal condition. After holding the at least one of the system conditions at the anneal condition, the system conditions are lowered.

Also disclosed is a method for forming a polycrystalline diamond compact. The method comprises introducing diamond grains to a high-pressure, high-temperature (HPHT) diamond press. The diamond grains are sintered in the HPHT diamond press to form a polycrystalline diamond material. The polycrystalline diamond material is annealed in the HPHT diamond press. Annealing the polycrystalline diamond material comprises holding, below a change point, at least one of a system temperature and a system pressure.

Also disclosed is a polycrystalline compact. The polycrystalline compact comprises grains of a hard material inter-granularly bonded to one another by elevating a temperature to which the grains are subjected, elevating a pressure to which the grains are subjected, lowering at least one of the temperature and the pressure past a change point, holding the at least one of the temperature and the pressure past the change point before lowering the temperature and the pressure to reach a final temperature and final pressure.

Also disclosed is a cutting element. The cutting element comprises a polycrystalline compact comprising grains of a hard material inter-granularly bonded to one another in the presence of a catalyst material by elevating system conditions to plateau levels, lowering at least one of the system conditions to an anneal level below a change point, holding the at least one of the system conditions at the anneal level before lowering the system conditions to final levels. A substrate is fixedly attached to the polycrystalline compact along an interface.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

In the present method, after the sintering stage of the HPHT process and during what would be the temperature and pressure dropping stages of the conventional HPHT system, anneal stages are utilized with the HPHT system. The anneal stages may be carried out after and proximate to change points in some embodiments. The anneal stages may be configured to accommodate atomic micro-restructuring, during state or phase changes, to form microstructures that are more stable as compared to atomic microstructures that form when change points are passed without an anneal stage. At least one of the temperature and/or pressure within the HPHT system may be held for a period of time during such anneal stages.

The anneal stages may be configured to accommodate solid-state atomic diffusion within the microstructures of the materials subjected to the HPHT process to achieve a more stable atomic configuration than may otherwise be formed. The anneal stages of the process may be configured to accommodate redistribution of otherwise relatively unstable atomic structures within the materials to relatively more stable atomic structures within the materials. Therefore, after achieving the end condition (e.g., room temperature and atmospheric pressure), the atomic structures within the formed cutting element may be more stable and less apt to suffer degradation than atomic structures of an object removed from an HPHT system without the anneal stages (i.e., hold conditions) during the post-sinter processing.

Thus, the HPHT methods of the present disclosure accommodate formation of more stable microstructures that may incorporate less residual stress and, therefore, may be less prone to lead to premature cracking and/or delamination at the interface between the diamond table and the supporting substrate of the cutting element when the cutting element is used in harsh environments.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits, and other drilling bits and tools known in the art.

As used herein, the term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "polycrystalline compact" means and includes any structure comprising a polycrystalline material formed by a process that involves application of pressure (e.g., compaction) to the precursor material (or materials) used to form the polycrystalline material.

As used herein, the term "hard material" means and includes any material having a Knoop hardness value of about 2,000 $Kg_f/mm^2$ (20 GPa) or more. In some embodiments, the hard materials employed herein may have a Knoop hardness value of about 3,000 $Kg_f/mm^2$ (29.4 GPa) or more. Such materials include, for example, diamond and cubic boron nitride.

As used herein, the term "inter-granular bond" means and includes any direct atomic bond (e.g., ionic, covalent, metallic, etc.) between atoms in adjacent grains of material.

As used herein, the term "catalyst material" refers to any material that is capable of substantially catalyzing the formation of inter-granular bonds between grains of hard material during an HPHT process. For example, catalyst materials for diamond include cobalt, iron, nickel, other elements from Group VIIIA of the Period Table of Elements, and alloys thereof.

As used herein, the term "non-catalyst material" refers to any material that is not a catalyst material.

As used herein, the term "nanoparticles," and "nano-" when referring to any material, means and includes any particle or material, respectively, having an average particle diameter of about 500 nm or less.

As used herein, the term "non-catalyst nanoparticles" means and includes any nanoparticle that does not comprise a catalyst material, diamond, or cubic boron nitride. Non-catalyst nanoparticles, in some embodiments, may comprise materials that are not any type of hard material, as defined below.

Figure 1:
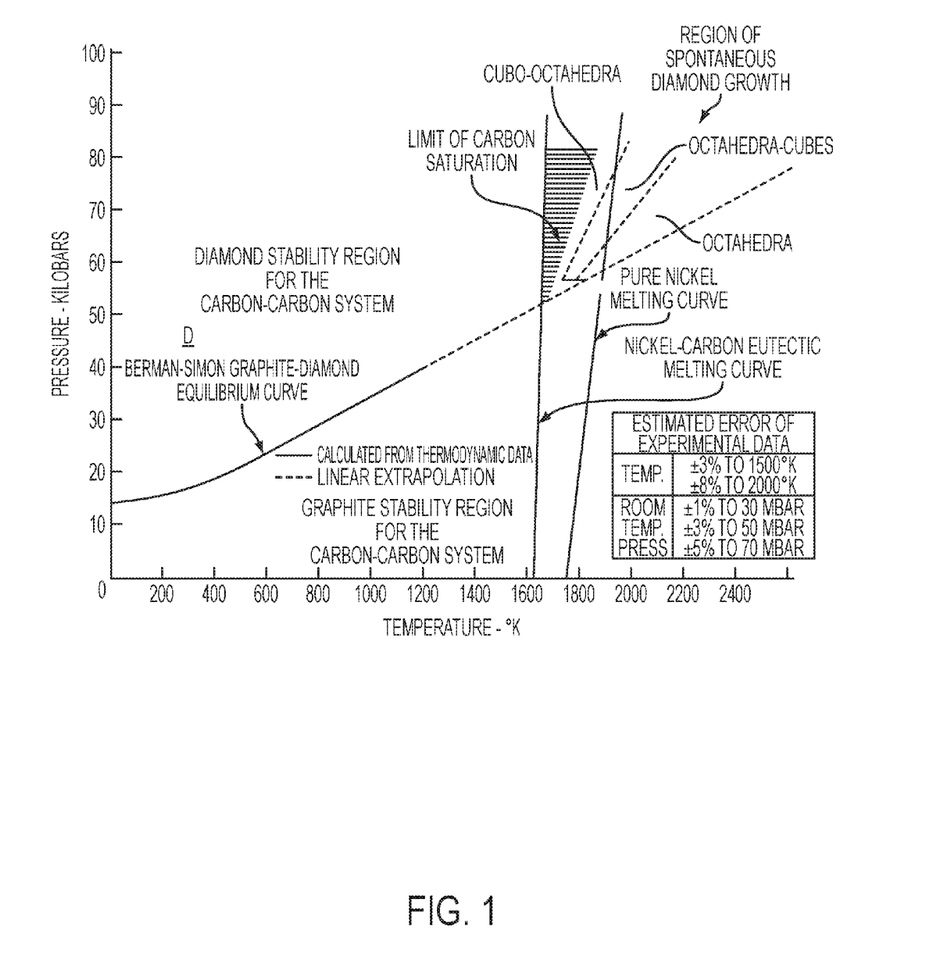
FIG. 1 is a carbon phase diagram.

As used herein, the term "change point" means and includes a pressure and temperature condition or a pressure and input-power condition at which a particular material tends to transition from one phase to another (e.g., liquid to solid, solid to solid, liquid to a combination of solid and liquid, a combination of liquid and solid to only solid, etc.). For a known material, change temperatures at a given pressure are generally known in the art. Similarly, for the known material, phase change pressures at a given temperature are generally known in the art. As such, for a given material at a given pressure, one may generally predict at what temperature the material will change phases or states. Similarly, for the given material at a given temperature, one may generally predict at what pressure the material will change phases or states. For example, a carbon phase diagram is set forth in FIG. 1 (as disclosed and discussed in U.S. Patent Application Publication 2010/0243337, filed Mar. 31, 2010, the disclosure of which is hereby incorporated herein by reference in its entirety). FIG. 1 illustrates the various phases of carbon, including the diamond stable phase D, and the temperatures and pressures at which such phases occur. For purposes of this disclosure, points along the Berman-Simon Graphite-Diamond Equilibrium Curve and other phase change lines within the diagram define "change points" for embodiments utilizing diamond hard material. Phase diagrams for other materials, such as other hard materials and various types of catalyst material are also generally known, and phase change lines (e.g., liquidus and solidus lines) within such diagrams may also define "change points."

As used herein, the term "holding" means and includes maintaining, at an essentially constant level, a system condition. Condition profiles during such "holding" stages define a minimum rate of change in the condition over the course of the HPHT process.

The illustrations presented herein are not actual views of any particular drill bit, cutting element, component thereof, or real-data graph of temperature versus time or pressure versus time. Rather, they are merely idealized representations that are employed to describe embodiments of the present disclosure.

Figure 2:
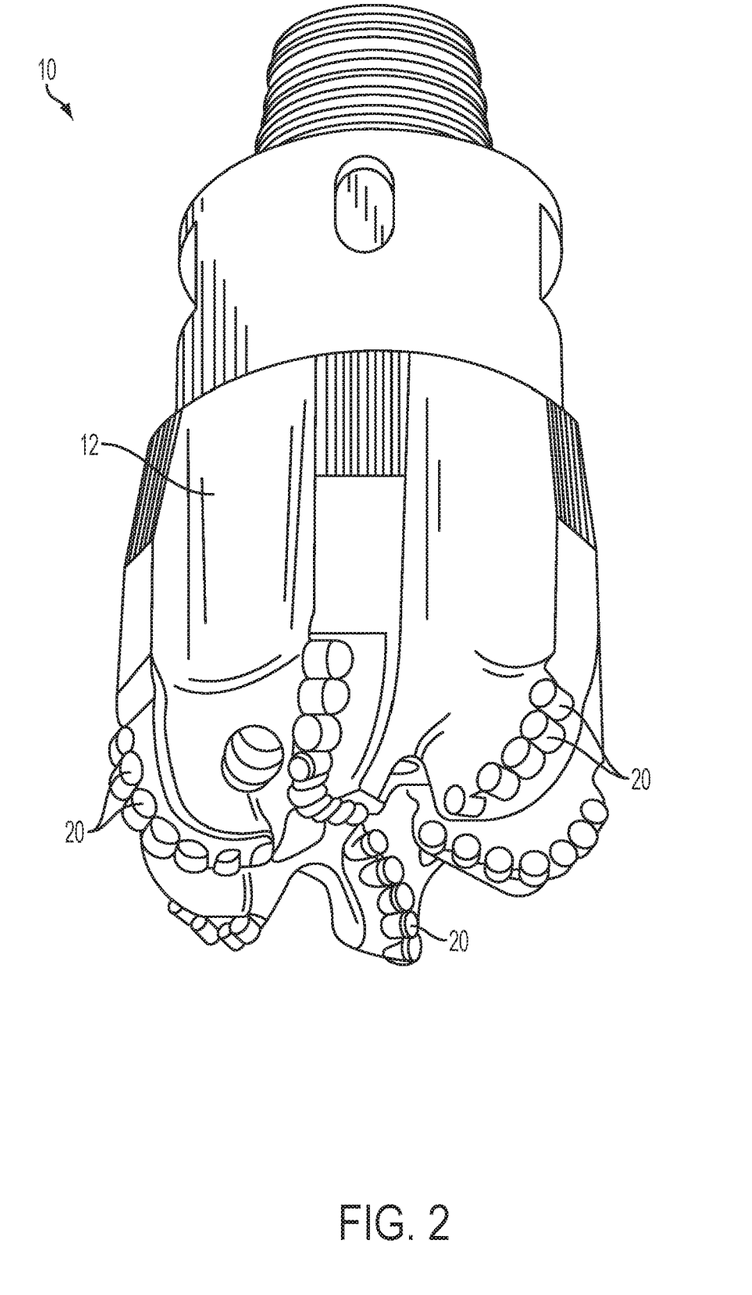
FIG. 2 is a perspective view of a fixed-cutter earth-boring rotary drill bit that includes cutting elements according to an embodiment of the present disclosure.

FIG. 2 illustrates a fixed-cutter type earth-boring rotary drill bit 10 that includes a bit body 12 and cutting elements 20. In other embodiments, another type of drill bit, such as any of the drill bits previously discussed, may include cutting elements 20 of the form illustrated in FIG. 2 or in an alternate structure. The cutting elements (e.g., cutting elements 20 of FIG. 2) included with the drill bit (e.g., drill bit 10 of FIG. 2) may be formed in accordance with any of the methods described herein.

Figure 3:
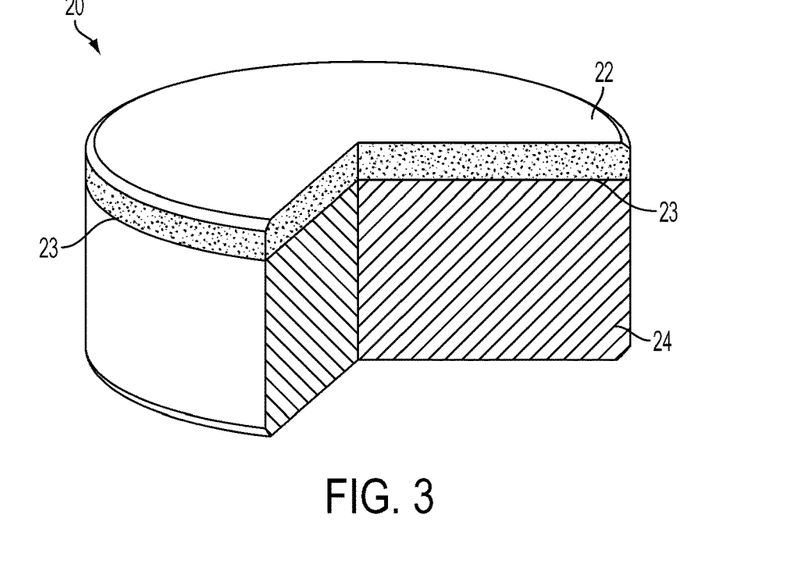
FIG. 3 is a partial cut-away perspective view illustrating an embodiment of a cutting element comprising a polycrystalline compact of the present disclosure.

FIG. 3 is a simplified, partially cut-away perspective view of an embodiment of a cutting element 20 of the present disclosure. The cutting element 20 comprises a polycrystalline compact in the form of a layer of hard material that may be formed of diamond and referred to in the art as a polycrystalline "table" 22. The table 22 is provided on (e.g., formed on or attached to) a supporting substrate 24 with an interface 23 therebetween. Though the cutting element 20 in the embodiment depicted in FIG. 3 is cylindrical or disc-shaped, in other embodiments, the cutting element 20 may have any desirable shape, such as a dome, cone, chisel, etc.

Furthermore, in some embodiments, the cutting element 20 may consist of a table 22 of the hard polycrystalline material that is not disposed on any supporting substrate 24.

In some embodiments, the polycrystalline material of the table 22 comprises diamond. In such embodiments, the cutting element 20 may be referred to as a polycrystalline diamond compact (PDC) cutting element. In other embodiments, the polycrystalline material of the table 22 may comprise another hard material, such as, for example, polycrystalline cubic boron nitride.

The composition of the supporting substrate 24 to which the table 22 of polycrystalline material is attached may be the same as or similar to that of conventional substrates. In some embodiments, the supporting substrate 24 may have a composition the same as or similar to the composition of the polycrystalline material of the table 22 to be formed. For example, the supporting substrate 24 may include the hard material included in the table 22. The supporting substrate 24 may additionally or alternatively include the catalyst material, such as cobalt, and a carbide material (e.g., tungsten carbide).

Figure 4:
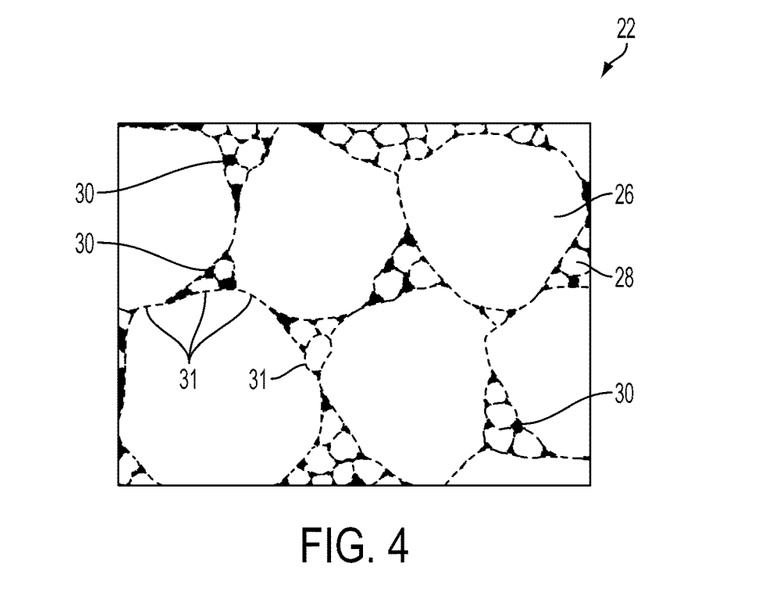
FIG. 4 is a simplified drawing showing how a microstructure of the polycrystalline compact of FIG. 3 may appear under magnification and illustrating interbonded and interspersed coarse and fine grains of hard material.

FIG. 4 is an enlarged view illustrating how a microstructure of the table 22 of the cutting element 20 (FIG. 3) may appear under magnification. The table 22 includes interbonded grains of hard material (e.g., diamond). The grains of hard material include both coarse grains 26 and fine grains 28 of the hard material. The coarse grains 26 are larger than the fine grains 28. In other embodiments, more than two general sizes of interbonded grains may be included in the table 22.

The fine grains 28 may be nanoparticles disposed in interstitial spaces between the interbonded coarse grains 26 of hard material. These nanoparticulate inclusions in the table 22 may minimize an amount of catalyst material 30 remaining in the table 22 after the catalyst material 30 is used to catalyze formation of the table 22 in a sintering process, such as an HPHT process. In other words, at least substantially non-catalyst nanoparticulate inclusions (i.e., nanoparticles) may be incorporated into the table 22 such that the amount of catalyst material 30 remaining in the interstitial spaces between interbonded coarse grains 26 of hard material and between the interbonded coarse grains 26 of hard material and the fine grains 28 of hard material in the microstructure after the sintering process (i.e., the HPHT process) is reduced by volumetric exclusion based on the presence of the non-catalyst nanoparticles.

The nanoparticle fine grains 28 of hard material may comprise non-catalyst material. For example, the nanoparticle fine grains 28 may comprise nanoparticles of diamond material, which may otherwise be referred to as "nanodiamond material" or "nanodiamond."

As shown in FIG. 4, the grains (e.g., the coarse grains 26 and the fine grains 28) of the table 22 optionally may have a multi-modal (e.g., bi-modal, tri-modal, etc.) grain size distribution in some embodiments. In some embodiments, the table 22 may comprise a multi-modal grain size distribution as disclosed in at least one of Provisional U.S. Patent Application Ser. No. 61/232,265, filed Aug. 7, 2009, entitled "Polycrystalline Compacts Including In-Situ Nucleated Grains, Earth-Boring Tools Including Such Compacts, and Methods of Forming Such Compacts and Tools"; U.S. patent application Ser. No. 12/852,313, filed Aug. 6, 2010, published Feb. 10, 2011, as U.S. Patent Application Publication 2011/0031034, entitled "Polycrystalline Compacts Including In-Situ Nucleated Grains, Earth-Boring Tools Including Such Compacts, and Methods of Forming Such Compacts and Tools"; and U.S. patent application Ser. No. 12/558,184, filed Sep. 11, 2009, published Mar. 17, 2011, as U.S. Patent Application Publication 2011/0061942, entitled "Polycrystalline Compacts Having Material Disposed in Interstitial Spaces Therein, Cutting Elements and Earth-Boring Tools Including Such Compacts, and Methods of Forming Such Compacts," the disclosure of each of which is incorporated herein in its entirety by this reference.

For example, the polycrystalline material within the table 22 (FIG. 4) may include a first plurality of grains of hard material having a first average grain size and at least a second plurality of grains of hard material having a second average grain size that differs from the first average grain size of the first plurality of grains. The second plurality of grains may be larger than the first plurality of grains. For example, the second plurality of grains may comprise coarse grains 26, and the first plurality of grains may comprise fine grains 28. For example, the average grain size of the larger grains, i.e., the coarse grains 26, may be at least about one hundred fifty (150) times greater than the average grain size of the smaller grains, i.e., the fine grains 28. In additional embodiments, the average grain size of the coarse grains 26 may be at least about five hundred (500) times greater than the average grain size of the fine grains 28. In yet further embodiments, the average grain size of the larger, coarse grains 26 may be at least about seven hundred fifty (750) times greater than the average grain size of the smaller, fine grains 28.

The fine grains 28 and the coarse grains 26 may be interspersed and interbonded to form the polycrystalline material of the diamond table 22. Accordingly, the smaller, fine grains 28 and the larger, coarse grains 26 may be mixed together and bonded directly to one another by inter-granular bonds 31, e.g., diamond-to-diamond bonds (represented by dashed lines in FIG. 4).

In other embodiments, the grains of the table 22 may have a single, mono-modal grain size distribution.

The formation of the inter-granular bonds 31 may be encouraged by subjecting the components of the polycrystalline material of the table 22 to be formed to high-pressure and/or high-temperature conditions. Often, the inter-granular bonds 31 form when the components of the cutting element 20 (FIG. 3) are compressed during production in an HPHT process (i.e., a sintering process).

Some embodiments of the method may further include use of nano-additives in the table 22 to be formed. Such nano-additives may function as nucleation sources, encouraging formation of smaller grains of the hard material that can then be inter-granularly bonded to larger grains of the hard material. U.S. patent application Ser. No. 12/852,313, filed Aug. 6, 2010, published Feb. 10, 2011, as U.S. Patent Application Publication 2011/0031034, entitled "Polycrystalline Compacts Including In-Situ Nucleated Grains, Earth-Boring Tools Including Such Compacts, and Methods of Forming Such Compacts and Tools," the disclosure of which is hereby incorporated by reference in its entirety, describes some such methods using nano-additives.

Figure 5:
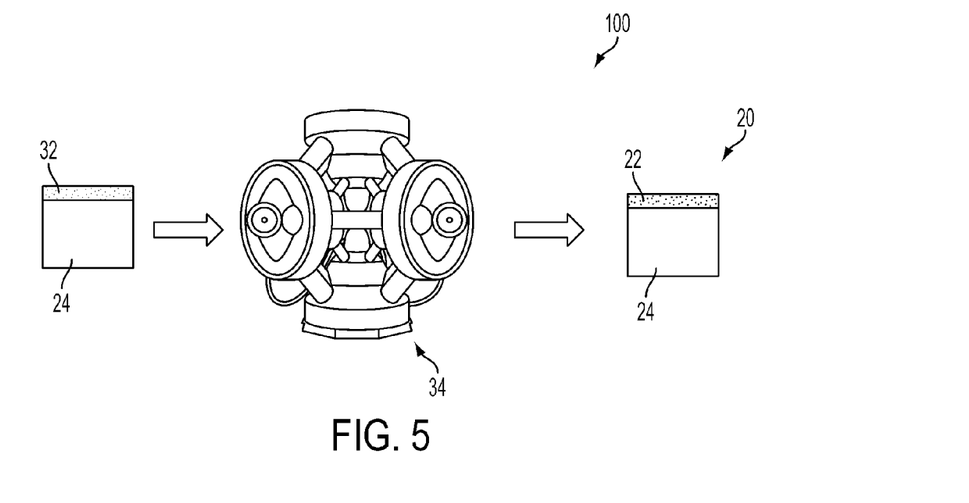
FIG. 5 is a simplified process flow illustration of a one-step HPHT process for forming a cutting element according to an embodiment of the present disclosure.
Figure 6:
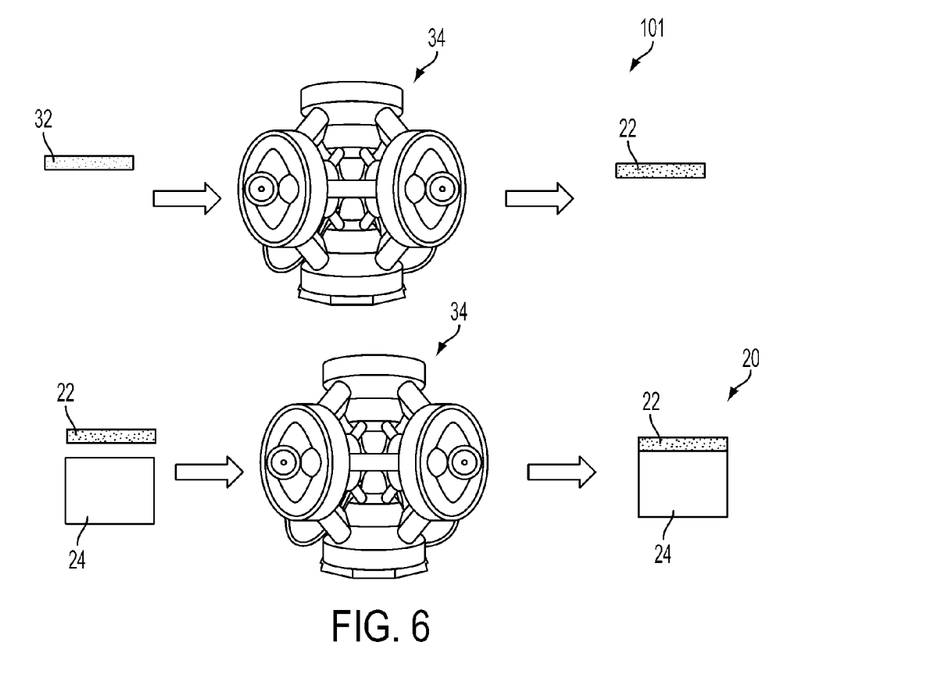
FIG. 6 is a simplified process flow illustration of a two-step HPHT process for forming a cutting element according to an embodiment of the present disclosure.

As illustrated in FIGS. 5 and 6, embodiments of the present methods may be used to form polycrystalline compacts for cutting elements 20 by forming a table 22 of the polycrystalline material on the supporting substrate 24 (e.g., FIG. 5), by forming the table 22 of the polycrystalline material and then later attaching the formed table 22 of the polycrystalline material to the supporting substrate 24 (e.g., FIG. 6), or by attaching a previously sintered table 22 of polycrystalline material to the supporting substrate 24 (e.g., second step of FIG. 6).

FIG. 5 illustrates a one-step HPHT process 100 in which cutting elements 20 are formed. As shown, a hard material feed 32 (e.g., a diamond feed or other hard material crystal feed, including non-inter-bonded hard material grains (or crystals)) to be included in the table 22 to be formed and a supporting substrate 24 are subjected to a press 34. In some embodiments, nano-level precipitates of catalyst may be included in the pre-mixed, hard material feed 32. In some such embodiments, the nano-level precipitates of catalyst may have also been included in a feed for formation of the supporting substrate 24. Methods of adding extremely well-dispersed catalyst in the hard material feed 32 may be utilized to form the table 22 of polycrystalline material, the supporting substrate 24, or both.

The press 34 is illustrated as a cubic press. Alternatively, the process may be performed using a belt press or a toroid press. In the press 34, the hard material feed 32 and the supporting substrate 24 are subjected to elevated pressures and temperatures to form the polycrystalline material of a polycrystalline compact structure. The resulting, compressed article, i.e., the cutting element 20, includes a table 22 of polycrystalline hard material connected to the supporting substrate 24.

FIG. 6 illustrates a two-step HPHT process 101, which may be utilized as an alternative to the one-step HPHT process of FIG. 5. As shown, the hard material feed 32, e.g., diamond material feed, is subjected to HPHT conditions in the press 34. In the press 34, the hard material feed 32 is subjected to elevated pressures and temperatures, the result of which is the formation of the polycrystalline material table 22. Where the hard material within the table 22 is diamond, the table may be referred to as a "diamond table." The table 22 and the supporting substrate 24 are then both subjected, together, to the press 34, again, to form the cutting element 20, which includes the table 22 of the polycrystalline material atop and bonded to the supporting substrate 24.

The second illustrated stage of FIG. 6 may be utilized with a previously sintered table 22 of polycrystalline material to bond the previously sintered table 22 of polycrystalline material to the supporting substrate 24. Thus, one supporting substrate 24 may be used to support one table 22 of polycrystalline material and may later be used to support a new table 22 of polycrystalline material. Likewise, one table 22 of polycrystalline material may be supported by one supporting substrate 24 and later be detached from the first supporting substrate 24 and re-bonded to a new supporting substrate 24, using the second illustrated stage of FIG. 6. Leaching may be carried out before or after the re-bonding. That is, the previously sintered table 22, either before re-attachment to the supporting substrate 24 or after the re-attachment, may optionally be subjected to a leaching process, as discussed in further detail below. In re-attachment embodiments, the original supporting substrate 24 and the new supporting substrate 24 may have the same or similar composition.

Figure 7:
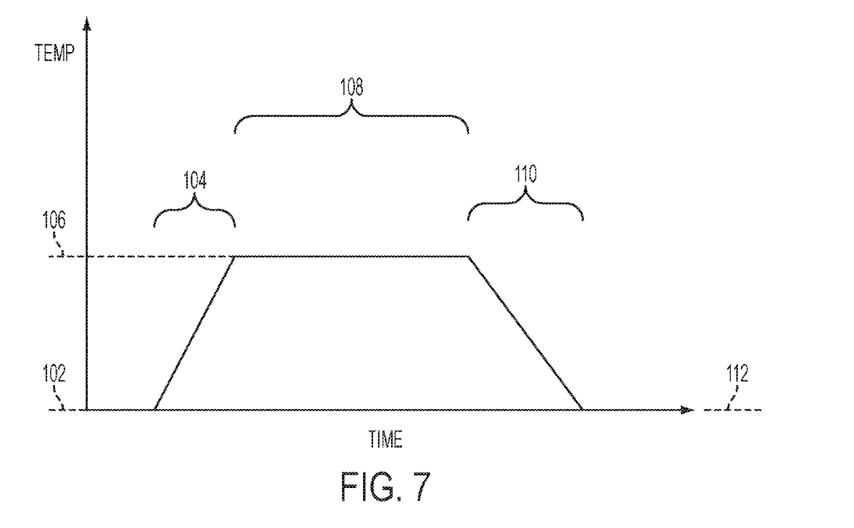
FIG. 7 is a temperature profile of a conventional HPHT process for forming a cutting element.
Figure 8:
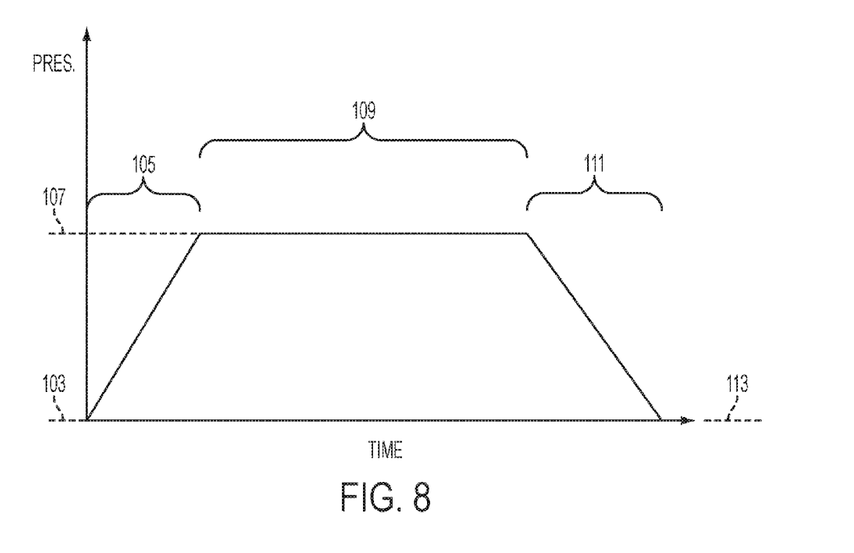
FIG. 8 is a pressure profile of a conventional HPHT process for forming a cutting element.

With reference to FIGS. 7 and 8, illustrated are graphs of temperature and pressure profiles of system conditions during an HPHT process. No particular temperature, pressure, or time scale is included with FIGS. 7 and 8 because the graphs are meant to depict relative conditions from one period of time to another. (The same applies to all other temperature profiles and pressure profiles discussed herein.) FIGS. 7 and 8 are graphed over the same hypothetical time period and are vertically aligned with one another. Accordingly, a vertical line drawn through both the temperature profile (FIG. 7) and the pressure profile (FIG. 8) would intersect the profiles at a single point in time in a HPHT process, and the intersection points would indicate the temperature and pressure levels in the HPHT process at that point in time. Therefore, conditions half-way along the TIME axis of FIG. 7 represent the temperature (i.e., TEMP) conditions half-way during a hypothetical HPHT process while conditions half-way along the TIME axis of FIG. 8 represent the pressure (i.e., PRES.) conditions at the same half-way period of time of FIG. 7. (The same applies to all other pairs of temperature profiles and pressure profiles discussed herein.)

The temperature, the pressure, or both the temperature and pressure of an HPHT system may be adjusted directly or indirectly and may or may not be monitored during the HPHT process. For example, the system temperature may be adjusted by controlling a level of power input such that increasing power yields an increase in system temperature. The temperature may not be directly monitored. After all, extreme temperatures in an HPHT system may not be easily detectable or attempting to detect such temperature may inhibit other parameters of the system. Therefore, it is contemplated that illustrated temperature profiles may be accomplished by means of adjusting power input levels, rather than by adjusting settings of a thermostat, or the like.

As graphed in the temperature profile of FIG. 7, according to an HPHT process, components of a cutting element 20 (FIG. 3) to be formed are introduced to a press 34 (FIG. 5 or 6) at an initial temperature 102. The initial temperature 102 may be below a hard material stable region, e.g., the diamond stable region D (see FIG. 1). The initial temperature may be room temperature (i.e., between about 20° C. and about 25° C.). Once in the press 34 (FIG. 5 or 6), the temperature to which the components (e.g., the grains of the hard material optionally in the presence of a catalyst material 30 (FIG. 4)) are subjected is gradually increased over a temperature raising stage (stage 104) to a plateau temperature 106. The plateau temperature 106 may be in the range of about 1400° C. to about 1500° C. The plateau temperature 106 may be maintained at a steady temperature for a substantial period of time during a temperature sintering stage (stage 108). The temperature sintering stage (stage 108) may be carried out for several minutes or longer. Thereafter, the temperature may be dropped during a temperature dropping stage (stage 110) directly to a final temperature 112. The final temperature 112 may be about equal to the initial temperature 102. The final temperature 112 may be well below the a hard material stable region, e.g., diamond stable region D (see FIG. 1).

As graphed in the pressure profile of FIG. 8, according to the same HPHT process graphed in FIG. 7, components of the cutting element 20 (FIG. 3) to be formed are also subjected to elevated pressures. The components (e.g., grains of hard material optionally in the presence of a catalyst material 30 (FIG. 4)) are introduced to the press 34 (FIG. 5 or 6) at an initial pressure 103. The initial pressure 103 may be atmospheric pressure (i.e., about 101.325 kPa). Pressure is increased to a plateau pressure 107 during a pressure raising stage (stage 105). As depicted, the pressure raising stage (stage 105) may be initiated before the temperature raising stage (stage 104) (FIG. 7) is initiated. The plateau pressure 107 may be in the range of about 5.0 GPa to about 6.0 GPa. The plateau pressure 107 may be maintained at a steady pressure during a pressure sintering stage (stage 109) for a duration of time (e.g., several minutes or longer) and thereafter be dropped during a pressure dropping stage (stage 111) directly to a final pressure 113. The final pressure 113 may be about equal to the initial pressure 103. The duration of the pressure sintering stage (stage 109) may not be equal to the duration of the temperature sintering stage (stage 108) (FIG. 7). However, the two stages (stages 109 and 108) may coincide or overlap. Likewise, the duration of the pressure dropping stage (stage 111) may not be equal to the duration of the temperature dropping stage (stage 110) (FIG. 7).

During the HPHT process, the carbon material within the table 22 (FIG. 3) as well as the other materials within the table 22 undergo state and/or phase changes because, as the pressure and temperature conditions change, the materials pass through change points, which are reflected in the phase-change lines of corresponding phase diagrams (e.g., FIG. 1 for carbon). Conditions may pass through change points during any point in the profile (FIGS. 7 and 8) at which temperature or pressure is changing. Accordingly, during the temperature dropping stage (stage 110) and the pressure dropping stage (stage 111), the carbon and/or catalyst material within the table 22 may undergo changes in atomic structure due to phase or state changes. The continued change of conditions, e.g., lowering of temperature or pressure, during the temperature dropping stage (stage 110) and the pressure dropping stage (stage 111) may lead to formation of stresses within the microstructure. Such residual stresses within the atomic structure of the materials within the table 22 of polycrystalline material may lead to premature cracking and delamination of the cutting element 20 along the interface 23, between the table 22 and the substrate 24.

In accordance with embodiments of the present disclosure, HPHT processes for forming a cutting element 20 (FIG. 3) may include one or more temperature and/or pressure anneal stages. These stages may follow the temperature and pressure sintering stages. The holds may be at temperatures and pressures just after conditions pass a change point. Subjecting the components of the cutting element 20 to be formed to temperature and/or pressure holds after change points may allow the atoms within the microstructure of the materials that have undergone a state or phase change to diffuse to a more stable microstructure than if temperatures and pressures continued to decrease rapidly after a change point. Therefore, stresses within the microstructure may be minimized, and the resulting components of the cutting element 20 may be less prone to premature cracking or delamination at the interface 23 of the table 22 and the supporting substrate 24.

Figure 9:
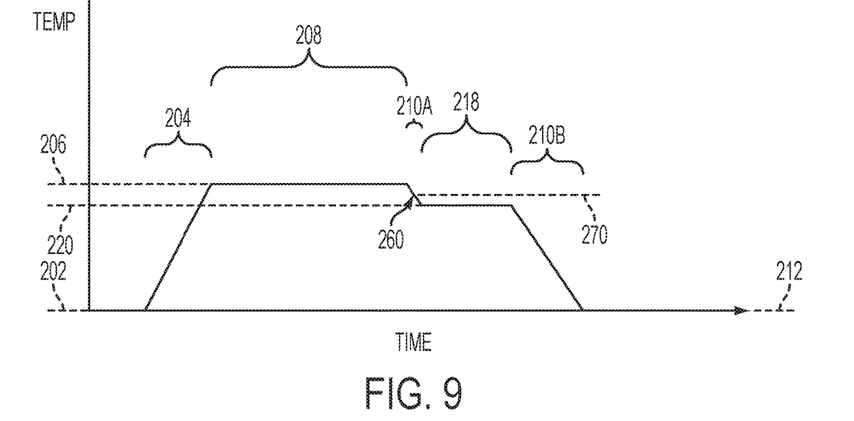
FIG. 9 is a temperature profile of an HPHT process for forming a cutting element according to an embodiment of the present disclosure, wherein a system temperature is held at a hold temperature below a change point and wherein a system pressure is not held at a hold pressure.
Figure 10:
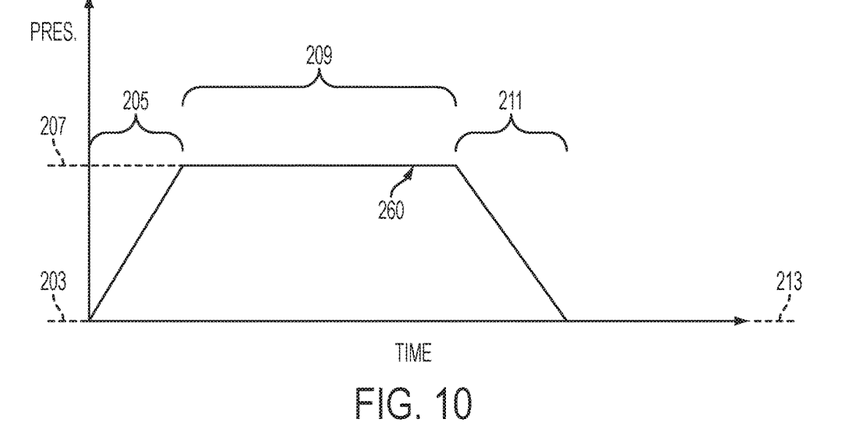
FIG. 10 is a pressure profile of the embodiment of FIG. 9.

With reference to FIGS. 9 and 10, graphed are a temperature profile (FIG. 9) and a pressure profile (FIG. 10) according to a first embodiment of the disclosure. As with a conventional process (FIGS. 7 and 8), the components (e.g., a hard material feed 32, a hard material feed 32 and supporting substrate 24, or a table 22 and supporting substrate 24 (FIGS. 5 and 6)) are introduced to a press 34 at an initial temperature 202 and an initial pressure 203. The temperature is increased to a plateau temperature 206 during a temperature raising stage (stage 204), and the pressure is increased to a plateau pressure 207 during a pressure raising stage (stage 205). The plateau temperature 206 may be about the same as the plateau temperature 106 (FIG. 7) of a conventional HPHT process or may be lower. The plateau pressure 207 may be about the same as the plateau pressure 107 (FIG. 8) of a conventional HPHT process or may be lower. The plateau temperature 206 is maintained for the duration of a temperature sintering stage (stage 208), and the plateau pressure 207 is maintained for the duration of a pressure sintering stage (stage 209). After the temperature sintering stage (stage 208) and the pressure sintering stage (stage 209), the temperature is lowered in a first temperature dropping stage (stage 210A) and the pressure is lowered in a pressure dropping stage (stage 211), respectively.

After the pressure and temperature pass a change point 260 during one or both of the first temperature dropping stage (stage 210A) and the pressure dropping stage (stage 211), such as a temperature and pressure at which one or more materials within the hard material feed 32 or the table 22 (e.g., the carbon of diamond material of coarse grains 26 and fine grains 28 or the catalyst material 30 (FIG. 4)), begin to undergo a phase or state change, the temperature of the HPHT system is held at a hold temperature 220 during a temperature anneal stage (stage 218). For example, the change point 260 may be a eutectic point of one or more of the materials within the table 22 to be formed, e.g., the hard material (of coarse grains 26 or fine grains 28) or the catalyst material 30 (FIG. 4). In some such embodiments, the hold temperature may be lower than about 1320° C., (e.g., within 100° C. of 1320° C., e.g., within 50° C. of 1320° C., e.g., within 10° C. of 1320° C.) The temperature anneal stage (stage 218) may be held for a duration in a range of about 30 seconds to about 60 minutes (e.g., in a range of about 30 seconds to about 10 minutes).

The pressure may also be held. As illustrated in FIG. 10, the pressure may be continued to be held during the pressure sintering stage (stage 209) during the temperature anneal stage (stage 218), before the pressure dropping stage (stage 211) is initiated.

A change point will occur at certain combinations of temperature and pressure. According the embodiment illustrated in FIGS. 9 and 10, the change point 260 occurs at a change point temperature 270 and at the plateau pressure 207. The hold temperature 220 is slightly lower than the change point temperature 270, and the pressure at which the HPHT system is held for at least a part of the duration of the temperature anneal stage (stage 218) is the same as the plateau pressure 207.

One of the temperature and the pressure may be maintained while the other condition is changed, as during the first temperature dropping stage (stage 210A). Both conditions may be held for at least part of an anneal stage, as during the first part of the temperature anneal stage (stage 218). Therefore, the conditions change at a slower rate or not at all, during an anneal stage, compared to a pressure and temperature profile of a conventional HPHT system (e.g., FIGS. 7 and 8).

According to the embodiment of FIGS. 9 and 10, only one anneal stage, a temperature anneal stage (stage 218), is utilized after one of the sintering stages (stages 208, 209). Therefore, the pressure profile (FIG. 10) is similar to a conventional pressure profile (e.g., FIG. 8). After the temperature anneal stage (stage 218), the temperature is lowered to the final temperature 212 during a second temperature dropping stage (stage 210B). The pressure is lowered directly to the final pressure 213 during the aforementioned pressure dropping stage (stage 211), which is initiated during the temperature anneal stage (stage 218).

As with the conventional process (FIGS. 7 and 8), the initiation time and duration of the temperature raising stage (stage 204) may not be the same as the initiation time and duration of the pressure raising stage (stage 205); the initiation time and duration of the temperature sintering stage (stage 208) may not be the same as the initiation time and duration of the pressure sintering stage (stage 209); and the initiation time and total duration of the first temperature dropping stage (stage 210A), temperature anneal stage (stage 218), and second temperature dropping stage (stage 210B) may not be the same as the initiation time and duration of the pressure dropping stage (stage 211). The duration of the entire HPHT cycle, i.e., between initiation of the first of the temperature raising stage (stage 204) and the pressure raising stage (stage 205) and completion of the last of the second temperature dropping stage (stage 210B) and the pressure dropping stage (stage 211) may be between about 10 minutes and about 20 minutes.

Figure 11:
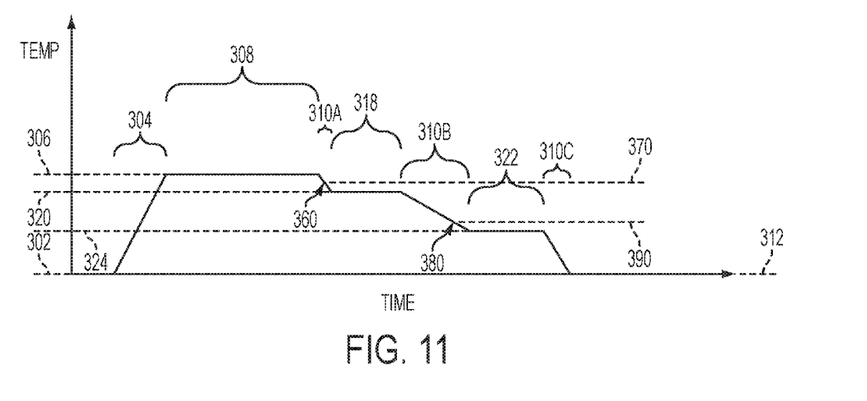
FIG. 11 is a temperature profile of an HPHT process for forming a cutting element according to another embodiment of the present disclosure, wherein a system temperature is held at a hold temperature below a change point and then held at another hold temperature below another change point and wherein a system pressure is not held at a hold pressure.
Figure 12:
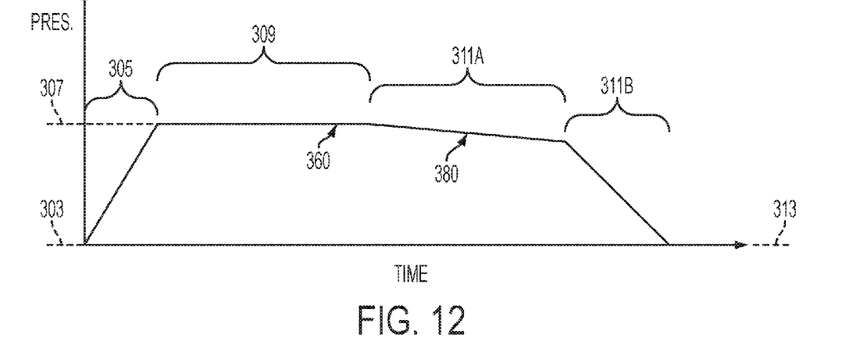
FIG. 12 is a pressure profile of the embodiment of FIG. 11.

According to an alternative embodiment, more than one condition anneal stages are implemented after at least one of the sintering stages. In some such embodiments, while one condition (i.e., temperature or pressure) is held, the other is lowered gradually. With reference to FIGS. 11 and 12, such a second embodiment is graphed. The process of this second embodiment may be similar to that of the first embodiment, with the description thereof similar to the description of FIGS. 9 and 10 with regard to the initial temperature 302, the initial pressure 303, the temperature raising stage (stage 304), the pressure raising stage (stage 305), the plateau temperature 306, the plateau pressure 307, the temperature sintering stage (stage 308), the pressure sintering stage (stage 309), the first temperature dropping stage (stage 310A), the final temperature 312, the final pressure 313, the first temperature anneal stage (stage 318), and the first hold temperature 320.

The system is held at a first hold temperature 320 just after the system passes a first change point 360 at a first change point temperature 370 and the plateau pressure 307. The first hold temperature 320 may be slightly lower than the first change point temperature 370 such that the system will be maintained at a temperature and pressure condition just past the first change point 360 for a period of time.

After the pressure sintering stage (stage 309), the pressure of the system is gradually lowered during a first pressure dropping stage (stage 311A). Therefore, during at least part of the first temperature anneal stage (stage 318), the pressure is either held steady (e.g., at the plateau pressure 307 just after the first change point 360) or only gradually lowered.

After the first temperature anneal stage (stage 318), the temperature is lowered during a second temperature dropping stage (stage 310B) as the pressure continues to be lowered during the first pressure dropping stage (stage 311A). The system may pass through a second change point 380, which, again, may be a state or change point for one or more materials within the HPHT system. Just after the second change point 380, the temperature of the system may again be held at a second hold temperature 324 during a second temperature anneal stage (stage 322). The second hold temperature 324 of the second temperature anneal stage (stage 322) may be just lower than the temperature of the system at the second change point 380, i.e., a second change point temperature 390. For example, the second hold temperature 324 may be below about 650° C. to below about 800° C. The duration of the second temperature anneal stage (stage 322) may be longer than the duration of the first temperature anneal stage (stage 318). For example, the first temperature anneal stage (stage 318) may be held for a duration in a range of about 30 seconds to about 60 minutes (e.g., in a range of about 30 seconds to about 10 minutes), while the second temperature anneal stage (stage 322) may be held for a duration in a range of about 5 minutes to about 24 hours (e.g., about 10 minutes to about 2 hours).

The pressure of the system may be maintained or gradually lowered during the second temperature anneal stage (stage 322). After the second temperature anneal stage (stage 322), the temperature may be lowered to the final temperature 312 during a third temperature dropping stage (stage 310C), and the pressure may be lowered to the final pressure 313 during a second pressure dropping stage (stage 311B).

As with the conventional process (FIGS. 7 and 8) and the first embodiment (FIGS. 9 and 10), the initiation time and duration of the temperature raising stage (stage 304) may not be the same as the initiation time and duration of the pressure raising stage (stage 305); the initiation time and duration of the temperature sintering stage (stage 308) may not be the same as the initiation time and duration of the pressure sintering stage (stage 309); and the initiation time and total duration of the first temperature dropping stage (stage 310A), the first temperature anneal stage (stage 318), the second temperature dropping stage (stage 310B), the second temperature anneal stage (stage 322), and the third temperature dropping stage (stage 310C) may not be the same as the initiation time and duration of the first pressure dropping stage (stage 311A) and the second pressure dropping stage (stage 311B).

Figure 13:
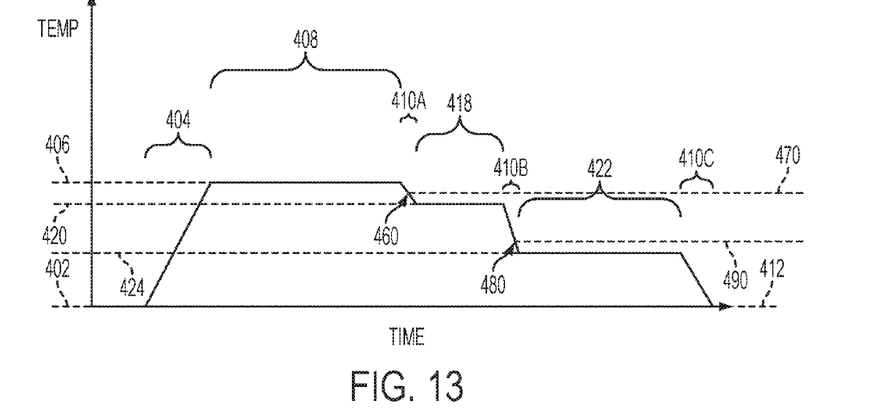
FIG. 13 is a temperature profile of an HPHT process for forming a cutting element according to another embodiment of the present disclosure, wherein a system temperature is held at a hold temperature below a change point and then held at another hold temperature below another change point and wherein a system pressure is held at a hold pressure.
Figure 14:
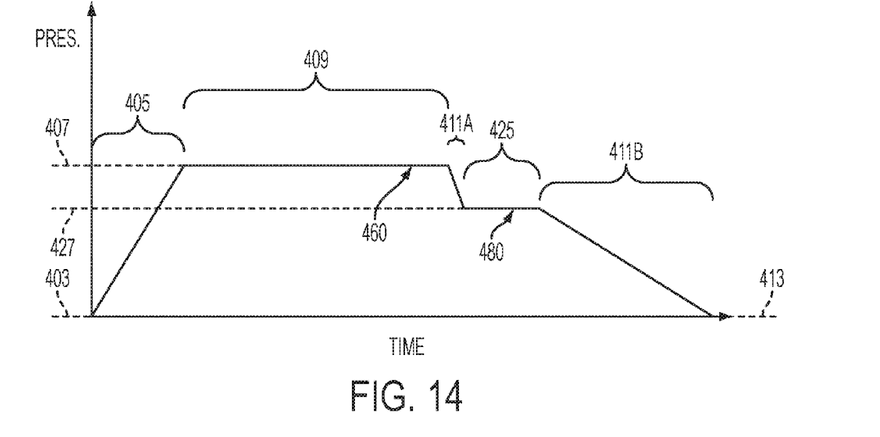
FIG. 14 is a pressure profile of the embodiment of FIG. 13.

According to another alternative embodiment, anneal stages of each of the temperature and the pressure are implemented after the sintering stages. With reference to FIGS. 13 and 14, such a third embodiment is graphed. The process of this third embodiment may be similar to that of the second embodiment, with the description thereof similar to the description of FIGS. 11 and 12 with regard to the initial temperature 402, the initial pressure 403, the temperature raising stage (stage 404), the pressure raising stage (stage 405), the plateau temperature 406, the plateau pressure 407, the temperature sintering stage (stage 408), the pressure sintering stage (stage 409), the first temperature dropping stage (stage 410A), the second temperature dropping stage (stage 410B), the third temperature dropping stage (stage 410C), the final temperature 412, the final pressure 413, the first temperature anneal stage (stage 418), the first hold temperature 420, the second temperature anneal stage (stage 422), the second hold temperature 424, the first change point 460, the first change point temperature 470, the second change point 480, and the second change point temperature 490.

According to the third embodiment, the pressure of the system is held during a pressure anneal stage. That is, the pressure is dropped after the plateau pressure 407 to a hold pressure 427 during a first pressure dropping stage (stage 411A) and held there during a pressure anneal stage (stage 425). The pressure anneal stage (stage 425) may be initiated prior to the second change point 480 and held for a period of time after the second change point 480. The duration of the pressure anneal stage (stage 425) may be shorter than the duration of the second temperature anneal stage (stage 422). For example, the second temperature anneal stage (stage 422) may be of an about 10 minute duration, and the pressure anneal stage (stage 425) may be of a duration less than about 10 minutes.

After the pressure anneal stage (stage 425), the pressure is lowered during a second pressure dropping stage (stage 411B) to the final pressure 413. Again, the various raising stages (stages 404 and 405), sintering stages (stages 408 and 409), and combined dropping and anneal stages (stages 410A, 418, 410B, 422, 410C and 411A, 425, 411B) may not be initiated at the same time or for the same duration, respectively. One or more of the temperature anneal stages (e.g., stages 418 or 422) may be initiated at and continue for the same duration as the pressure anneal stage (stage 425).

Though the above-described embodiments depict a certain number of anneal stages and limited number of combination of temperature holds, pressure holds, and gradual decreases during holds, other embodiments may incorporate alternative combinations of anneal stages. In any regard, holds of one or more conditions of the HPHT system may be implemented just after a change point, where the change point is defined by conditions at which at least one material subjected to the HPHT process is prone to undergo a state or phase change. By adding a hold to the HPHT system, residual stresses within the atomic microstructure of the components of the cutting element 20 (FIG. 3) may be reduced along with the likelihood of premature cracking and delamination along the interface 23 of the table 22 and the supporting substrate 24.

In other embodiments, modulations of the temperature and/or pressure may be utilized. In such embodiments, the conditions graphed in the temperature versus time and pressure versus time profiles (FIGS. 7-14) may represent local averages or general trends, though the actual temperatures or pressures may oscillate around the illustrated lines.

In any of the foregoing embodiments, the table 22 may, optionally, be subjected to a leaching process to remove some or substantially all of the catalyst material 30 (FIG. 4) from the interstitial spaces between the inter-bonded grains (e.g., inter-bonded coarse grains 26 and fine grains 28 (FIG. 4)) using, for example, an acid leaching process. For example, one or more of the leaching processes described in U.S. Pat. No. 4,224,380, issued Sep. 23, 1980; U.S. Pat. No. 5,127,923, issued Jul. 7, 1992; and U.S. Pat. No. 8,191,658, issued Jun. 5, 2012, the disclosures of each of which are incorporated herein by this reference, may be utilized to remove some or substantially all of the catalyst material 30 from the table 22. Such leaching process may be carried out following sintering of the table 22.

When carrying out the present method, one may be mindful of the highest temperatures that are maintainable without detriment to the hard material (e.g., the highest temperatures at which a diamond crystalline structure may be maintained without a phase change to a graphite structure). Additional consideration may be given to carbide and cobalt (or other catalyst material) phases, when such carbide and cobalt materials are included within the supporting substrate 24 and the table 22, respectively, whereby temperatures may need to be decreased below 550° C., or the appropriate temperature, given the pressure, at which a phase transformation of cobalt (or other catalyst material) would occur.

Hold conditions during all or any of the temperature and/or pressure stages may be maintained for about thirty seconds or more. For example, hold conditions for any particular stage may be maintained for at least two minutes, e.g., between two and three minutes, inclusive. As another example, hold conditions for any particular stage may be maintained for at least fifteen minutes, e.g., between fifteen minutes and one hour, inclusive. As another example, hold conditions for any particular stage may be maintained for at least one hour, e.g., between one hour and ten hours. As another example, hold conditions for any particular stage may be maintained for about twenty-four hours.

Multiple hold temperatures and hold times may be utilized in succession. That is, more than one anneal stage may be used. Between hold conditions, a ramp (i.e., change) of conditions may be carried out. The ramp of conditions may be moderate. For example, the pressure subjected upon the materials within the HPHT system may be slowly decreased until a hold condition at a relatively low pressure of about 100 MPa. Alternatively, the pressure subjected upon the materials by the HPHT system may be successively increased and decreased in one or multiple ramp segments.

One or more ramp segments may involve a rapid change of at least one of the pressure and temperature conditions. For example, in a ramp segment, the temperature to which the object is subjected may be rapidly decreased by the HPHT system via utilization of cryo-cooling.

The present methods may be used when forming PDC drag bits and other related downhole tools.

The polycrystalline diamond compacts resulting from the methods herein above described and cutting elements comprising such polycrystalline diamond compacts are also encompassed by this disclosure.

Additional non-limiting example embodiments of the disclosure are described below.

Embodiment 1

A method for forming a cutting element comprising a polycrystalline material supported by a substrate, the method comprising introducing grains of a hard material to a press; elevating a system temperature to a sintering temperature; elevating a system pressure to a sintering pressure; lowering the system temperature to a hold temperature past a change point at a change point temperature, the hold temperature being lower than the change point temperature; holding the system temperature at the hold temperature; and lowering the system temperature to a final temperature.

Embodiment 2

The method of Embodiment 1, further comprising lowering the system temperature from the hold temperature to a second hold temperature past a second change point at a second change point temperature, the second hold temperature being lower than the second change point temperature; and holding the system temperature at the second hold temperature.

Embodiment 3

The method of any one of Embodiments 1 and 2, further comprising lowering the system pressure to a hold pressure past the change point; and holding the system pressure at the hold pressure.

Embodiment 4

The method of Embodiment 3, wherein holding the system pressure at the hold pressure is initiated simultaneously with holding the system temperature at the hold temperature.

Embodiment 5

The method of any one of Embodiments 1 through 4, further comprising lowering the system pressure while holding the system temperature at the hold temperature.

Embodiment 6

A method for forming a polycrystalline compact for a cutting element of a drilling tool, the method comprising subjecting grains of a hard material to a press; adjusting system conditions comprising a system temperature and a system pressure to plateau levels, comprising adjusting the system temperature to a plateau temperature; and adjusting the system pressure to a plateau pressure; sintering the grains of the hard material at the plateau levels; adjusting at least one of the system conditions from the plateau levels past a change point to an anneal level; holding at the anneal level the at least one of the system conditions adjusted to the anneal level; and after holding the at least one of the system conditions at the anneal level, lowering the system conditions.

Embodiment 7

The method of Embodiment 6, wherein subjecting grains of a hard material to a press comprises subjecting coarse grains of the hard material and fine grains of the hard material to the press.

Embodiment 8

The method of any one of Embodiments 6 and 7, wherein subjecting grains of a hard material to a press comprises subjecting grains of at least one of diamond and cubic boron nitride to the press.

Embodiment 9

The method of any one of Embodiments 6 through 8, wherein adjusting at least one of the system conditions from the plateau levels past a change point to an anneal level comprises adjusting at least one of the system conditions from the plateau levels past a eutectic point of the hard material to the anneal level.

Embodiment 10

The method of any one of Embodiments 6 through 9, wherein adjusting at least one of the system conditions from the plateau levels past a change point to an anneal level comprises lowering the system temperature from the plateau levels past a change point to an anneal temperature below about 1320° C.

Embodiment 11

The method of any one of Embodiments 6 through 10, wherein holding at the anneal level the at least one of the system conditions comprises holding at the anneal level the at least one of the system conditions for a duration in a range of about thirty seconds to about ten minutes.

Embodiment 12

The method of any one of Embodiments 6 through 11, further comprising, before lowering the system conditions adjusting at least one of the system conditions from the anneal level past another change point to another anneal level; and holding at the another anneal level the at least one of the system conditions adjusted to the another anneal level.

Embodiment 13

The method of Embodiment 12, wherein adjusting at least one of the system conditions from the anneal level past another change point to another anneal level comprises lowering the system temperature from an anneal temperature of below about 1320° C. past the another change point to another anneal temperature of below about 800° C.

Embodiment 14

The method of Embodiment 13, wherein lowering the system temperature from an anneal temperature of below about 1320° C. past the another change point to another anneal temperature of below about 800° C. comprises lowering the system temperature from the anneal temperature of below about 1320° C. past the another change point to another anneal temperature of below about 650° C.

Embodiment 15

The method of any of Embodiments 12 through 14, wherein holding at the another anneal level the at least one of the system conditions adjusted to the another anneal level comprises holding at the another anneal level the at least one of the system conditions adjusted to the another anneal level for a duration in a range of about five minutes to about two hours.

Embodiment 16

The method of any of Embodiments 12 through 15, wherein holding at the another anneal level the at least one of the system conditions adjusted to the another anneal level comprises holding at the another anneal level the at least one of the system conditions adjusted to the another anneal level for a longer duration than that of holding at the anneal level the at least one of the system conditions adjusted to the anneal level.

Embodiment 17

A method for forming a polycrystalline diamond compact, the method comprising introducing diamond grains to a high-pressure, high-temperature (HPHT) diamond press; sintering the diamond grains in the HPHT diamond press to form a polycrystalline diamond material; and annealing the polycrystalline diamond material in the HPHT diamond press, comprising holding, below a change point, at least one of a system temperature and system pressure.

Embodiment 18

A polycrystalline compact comprising grains of a hard material inter-granularly bonded to one another by elevating a temperature to which the grains are subjected, elevating a pressure to which the grains are subjected, lowering at least one of the temperature and the pressure past a change point, holding the at least one of the temperature and the pressure past the change point before lowering the temperature and the pressure to reach a final temperature and final pressure.

Embodiment 19

The polycrystalline compact of Embodiment 18, wherein the grains of the hard material comprise a multi-modal grain size distribution.

Embodiment 20

A cutting element comprising a polycrystalline compact comprising grains of a hard material inter-granularly bonded to one another in the presence of a catalyst material by elevating system conditions to plateau levels, lowering at least one of the system conditions to an anneal level below a change point, holding the at least one of the system conditions at the anneal level before lowering the system conditions to final levels; and a substrate fixedly attached to the polycrystalline compact along an interface.

Although the foregoing description contains many specifics, these are not to be construed as limiting the scope of the present invention, but merely as providing certain embodiments. Similarly, other embodiments of the invention may be devised that do not depart from the scope of the present invention. For example, materials, techniques, conditions, and durations described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method of forming a cutting element of a drilling tool, the method comprising:
    subjecting diamond grains to a press;
    adjusting system conditions of the press, the system conditions comprising a system temperature and a system pressure, comprising:
        elevating the system temperature to a sintering temperature; and
        elevating the system pressure to a sintering pressure;
    sintering the diamond grains in the press to form a polycrystalline compact;
    lowering the system pressure past a change point of the diamond grains to an anneal pressure;
    holding the system pressure at the anneal pressure;
    after holding the system pressure at the anneal pressure, lowering at least one of the system conditions; and
    attaching a substrate to the polycrystalline compact.

2. The method of claim 1, further comprising selecting the substrate to comprise at least one of a hard material, a catalyst material, or a carbide material.

3. The method of claim 1, wherein subjecting diamond grains to the press comprises subjecting a first plurality of diamond grains having a first average grain size and a second plurality of diamond grains having a second average grain size to the press.

4. The method of claim 3, further comprising selecting the first average grain size to be at least about 150 times greater than the second average grain size.

5. The method of claim 1, further comprising lowering the system temperature to an anneal temperature such that the system temperature is lowered to less than about 1320° C.

6. The method of claim 5, further comprising holding the system temperature at the anneal temperature for a duration in a range of about 30 seconds to about 60 minutes.

7. The method of claim 1, wherein elevating the system temperature to a sintering temperature comprises elevating a system temperature to a plateau sintering temperature.

8. The method of claim 1, wherein elevating the system pressure to a sintering pressure comprises elevating a system pressure to a plateau sintering pressure.

9. The method of claim 1, further comprising lowering the system conditions to final system conditions.

10. The method of claim 1, further comprising:
    lowering the system temperature to an anneal temperature; and
    holding the system temperature at the anneal temperature such that the system pressure is held at the anneal pressure for a duration less than the system temperature is held at the anneal temperature.

11. The method of claim 10, wherein the duration of holding the system pressure at the anneal pressure is less than about 10 minutes.

12. The method of claim 10, wherein the duration of holding the system temperature at the anneal temperature is about 10 minutes.

13. The method of claim 1, wherein after holding the system pressure at the anneal pressure, lowering at least one of the system conditions comprises lowering the system temperature to a temperature past a change point to an anneal temperature.

14. The method of claim 13, wherein lowering the system temperature to a temperature past a change point to the anneal temperature comprises lowering the system temperature to the temperature past the anneal temperature while lowering the system pressure to the anneal pressure.

15. The method of claim 13, wherein lowering the system temperature to a temperature past the change point to the anneal temperature comprises lowering the system temperature to a temperature less than about 800° C.

16. The method of claim 13, further comprising holding the system temperature at the temperature past the change point to the anneal temperature for a duration in a range of about 5 minutes to about 24 hours.

17. A method of forming a cutting element of a drilling tool, the method comprising:
    subjecting grains of a hard material to a press;
    adjusting system conditions of the press, the system conditions comprising a system temperature and a system pressure, comprising:
        elevating the system temperature to a sintering temperature; and
        elevating the system pressure to a sintering pressure;
    sintering the grains of the hard material in the press to form a polycrystalline compact;
    annealing the polycrystalline compact by lowering the system pressure past a change point of the grains of the hard material to an anneal pressure;
    after annealing the polycrystalline compact, lowering the system conditions; and
    attaching a substrate to the polycrystalline compact.

18. The method of claim 17, wherein annealing the polycrystalline compact further comprises lowering the system temperature past the change point of the grains of the hard material to an anneal temperature.

19. The method of claim 18, wherein annealing the polycrystalline compact further comprises holding the system temperature at the anneal temperature while lowering the system pressure to the anneal pressure.

20. The method of claim 18, further comprising holding the system pressure at the anneal pressure, and wherein annealing the polycrystalline compact further comprises holding the system temperature at the anneal temperature while holding the system pressure at the anneal pressure.

* * * * *